UNITED STATES PATENT OFFICE 3,849,453
Patented Nov. 19, 1974

3,849,453
QUINONE DERIVATIVES
Hiroshi Morimoto, Nishinomiya, Masazumi Watanabe, Takatsuki, Isuke Imada, Ibaraki, and Masao Nishikawa, Kyoto, Japan, assignors to Takeda Chemical Industries, Ltd., Osaka, Japan
No Drawing. Filed Mar. 15, 1971, Ser. No. 124,547
Claims priority, application Japan, Mar. 17, 1970, 45/22,497; Mar. 18, 1970, 45/22,805
Int. Cl. C07c 63/52
U.S. Cl. 260—396 R         5 Claims

ABSTRACT OF THE DISCLOSURE

Compounds of the formula

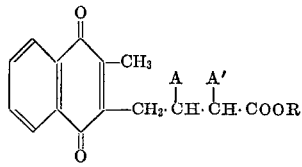

wherein R is hydrogen, alkyl, cycloalkyl or unsaturated alkyl and one of A and A' is hydrogen and the other is lower alkyl and salts thereof have effective vitamin K and anti-inflammatory action.

QUINONE DERIVATIVES

The present invention relates to novel quinone derivatives and their pharmaceutically acceptable salts, which have effective vitamin K and anti-inflammatory action. The present invention also relates to a method for the production of these novel quinone derivatives.

The present inventors have made extensive studies on quinone derivatives to succeed in synthesizing present novel quinone derivatives and found out that these novel quinone derivatives have effective vitamin K action, and anti-inflammatory action due to their stabilizing activity of lysosomal membrane. The present invention was accomplished on the basis of these findings.

Thus, the principal object of the present invention is to provide these novel compounds and their pharmaceutically acceptable salts useful as medicines such as vitamin K or anti-inflammatory agents. Another object of the present invention is to provide an industrially feasible method for the production of these novel compounds.

The compounds of the present invention are those represented by the following general formula (I)

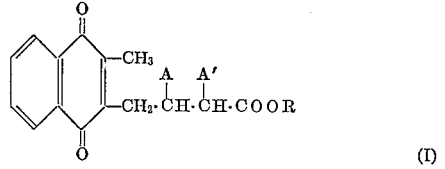

(wherein R stands for a hydrogen atom or an alkyl group, and one of A and A' is a hydrogen atom and the other is a lower alkyl group) or their pharmaceutically acceptable salts.

In the following, detailed explanation is made of the present invention.

In the general formula (I), the lower alkyl groups represented by the symbol A or A' are preferably those having 1 to 4 carbon atoms. Typical examples of the group are methyl, ethyl, propyl, isopropyl, butyl, isobutyl, sec-butyl, and tert-butyl.

In the present specification the group R is, for convenience, referred to as alkyl group. However, it is to be noted that the R may be straight or branched chain alkyl, cycloalkyl or unsaturated alkyl, preferably the R containing from 1 to 6 carbon atoms. Typical examples of the group are methyl, ethyl, propyl, isopropyl, allyl, butyl, isobutyl, sec-butyl, tert-butyl, pentyl, cyclopentyl, hexyl and cyclohexyl.

The present compounds (I) are produced by reacting the compound (II)

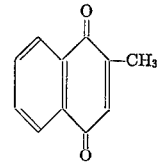

with a compound (III)

(wherein A, A' and R have the same meaning as above).

The reaction is generally carried out in an inert solvent. The amount of the compound (III) is generally about 1 mole per mole of the (II). Typical examples of the inert solvent are hydrocarbons or their derivatives such as n-hexane, ligroin and organic acid such as acetic acid. The reaction is preferably carried out at about 80 to 100° C., and the reaction time is usually about 0.5 to about 3 hours.

The end point of the present reaction may be confirmed by thin-layer chromatography technique. In this case, a color reaction with leucomethylene blue or significant ultraviolet absorption spot(s) due to the reaction products(s) and the unreacted starting compounds may be utilized.

When an object compound (I) is obtained as the ester, the ester may be easily converted into a free carboxylic acid of the general formula (I) by per se known hydrolysis means.

Alternatively, the obtained free carboxylic acid of the general formula (I) may be easily converted into a corresponding pharmaceutically acceptable salt by per se known means using a suitable base such as alkali metal hydroxides (e.g. sodium hydroxide, potassium hydroxide), alkali metal carbonates (e.g. sodium carbonate, potassium carbonate) or organic bases (e.g. methylamine, dimethylamine), etc.

After completion of the reaction(s), the object compound (I) or its salt is easily isolated together with recovery of the unreacted starting compound (II) by per se known means (e.g. extraction, distillation, recrystallization, chromatography, etc.).

In respect to the compounds (I) or their salts, there are two kinds of optical isomer due to their intramolecular asymmetric carbon atom.

Thus, when an object compound (I) is obtained as a mixture of a l-isomer and an d-isomer, the mixture of the two isomers may be isolated respectively, if desired, by per se known means for optical resolution (e.g. resolution of disastereoisomer).

The compound (III), one of the starting compounds of the present invention, includes novel ones and may be produced by the steps described in the following schema.

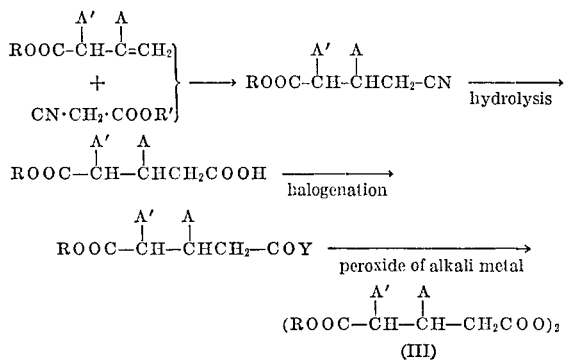

(wherein A, A' and R have the same meaning as above, R' stands for a lower alkyl group, Y is a halogen atom).

When thus obtained compounds (I) or their salts are employed as anti-inflammatories, the compounds are usually administered orally in an amount ranging from 25 milligrams to 800 milligrams per day for an adult.

In addition, it is to be noted that the compounds (I) or their salts have effective vitamin K action and therefore that those novel compounds can be used for treating the vitamin deficiency diseases in place of natural vitamin.

For further explanation of the present invention, the following Examples and References are given wherein the word "part(s)" is based on weight unless otherwise noted and the relationship between "part" and "volume part" corresponds to that between gram and milliliter.

REFERENCE—PRODUCTION OF THE STARTING COMPOUND (1) To a solution of sodium methoxide prepared from 27 parts of metallic sodium in 400 volume parts of methyl alcohol is added 133 parts of methyl cyanoacetate, and to the whole mixture is added 135 parts of methyl-α-methylacrylate under ice-cooling, followed by keeping at the same temperature for 2.5 hours. Then, to the reaction mixture is added 50 volume parts of water, and the whole mixture is subjected to distillation to remove off 300 volume parts of a mixture of the solvent and water. To the residual mixture is added 150 volume parts of water, and the whole mixture is subjected to distillation to remove off 100 volume parts of a mixture of the solvent and water, and further to the resultant is added 150 volume parts of water, and the whole mixture is again subjected to distillation to remove off 250 volume parts of a mixture of the solvent and water.

The residue is made acid with diluted hydrochloric acid, and the resultant is extracted with ethyl ether. The ether extract is washed with water, dried over sodium sulfate, and subjected to distillation under a reduced pressure to give 53 parts of methyl γ-cyano-α-methyl butyrate as a colorless liquid boiling at 91 to 93° C./10 mm. Hg.

(2) To 17.5 parts of methyl γ-cyano-α-methylbutyrate is added slowly 36 volume parts of concentrated sulfuric acid under stirring at −10° C., followed by stirring for 10 minutes of the same temperature, and then stirring for 20 minutes at room temperature.

Then, to the reaction mixture is added 48 parts of ice, and, further, to the whole mixture is added 78 volume parts of a 30 weight percent aqueous solution of sodium nitrite, followed by keeping 0° C. for 1.5 hours.

Then, the reaction mixture is saturated with sodium sulfate, and the whole mixture is extracted with chloroform. The chloroform extract is washed with water, dried over sodium sulfate, and then subjected to distillation. The residue is subjected to distillation under a reduced pressure to give 12.6 parts of α-methylglutaric acid monomethyl ester as colorless liquid boiling at 105 to 110° C./0.07 mm. Hg.

(3) To 4.3 parts of α-methylglutaric acid monomethyl ester is added 2.5 volume parts of oxalyl chloride, and, after substantially no generation of gases is observed any longer, the reaction mixture is subjected to distillation under a reduced pressure to remove the excess oxalyl chloride. This procedure gives 4.7 parts of γ-methoxycarbonylvaleryl chloride as a colorless liquid.

(4) To a solution of 7 parts of γ-methoxycarbonylvaleryl chloride in 35 volume parts of ethyl ether is added 3.5 parts of sodium peroxide, followed by stirring at −10° C. for 3 hours. After completion of the reaction, to the reaction mixture is added ice, and the ether layer is collected by separation. The ether solution is subjected to distillation under a reduced pressure to give 3.9 parts of di-γ-methoxycarbonylvaleryperoxide as colorless liquid.

Example 1

To a solution of 0.35 part of 2-methyl-1,4-naphthoquinone in 5 volume parts of acetic acid is added 0.65 part of di-γ-methoxycarbonylvalerylperoxide at 90 to 95° C., followed by stirring at the same temperature range for 2 hours. After cooling, the reaction mixture is neutralized with a 10 weight percent aqueous solution of sodium carbonate containing sodium dithionite, and the whole mixture is extracted with ethyl ether. The ether extract is shaken together with a 10 weight percent aqueous solution of ferric chloride, and then the ether layer is collected by separation. The ether layer is washed with water, dried over anhydrous sodium sulfate, and then subjected to distillation under a reduced pressure to remove the solvent. The residue is subjected to thin-layer chromatography using hexane ethyl ether (4:1) as a developing solvent, and 0.156 part of 2-methyl-1,4-naphthoquinone is taken from the portion corresponding to $R_f$ value of 0.67 of the chromatogram and 0.192 part of 2-methyl-3-(3-methyl-3-methoxycarbonylpropyl)-1,4-naphthoquinone as a yellow oily substance is taken from the portion corresponding to $R_f$ value of 0.48 of the chromatogram.

Significant maximum absorptions in ultraviolet absorption spectrum (λ in $C_2H_5OH$, mμ):

oxidized form; 244, 248, 262, 270, 330
reduced form; 245, 271, 325, 334

Significant maximum absorptions in infrared absorption spectrum (ν in film, cm.$^{-1}$): 1740, 1300($COOCH_3$), 1660, 1620(quinone).

Nuclear magnetic resonance spectrum (τ in $CCl_4$): 6.36 ($COOCH_3$)

Elementary analysis.—$C_{17}H_{18}O_4$:
Calculated: C, 71.31; H, 6.34.
Found: C, 71.74; H, 6.45.

Example 2

To a solution of 1 part of 2-methyl-1,4-naphthoquinone in 10 volume parts of acetic acid is added slowly 2 parts of di-γ-methoxycarbonylvalerylperoxide under stirring at 90 to 95° C. over 1 hour, then followed by stirring for 4 hours or longer at the same temperature.

After a similar manner to Example 1, 0.93 part of 2-methyl - 3 - (3 - methyl-3-methoxycarbonylpropyl)-1,4-naphthoquinone is obtained, and 0.33 part of 2-methyl-1,4-naphthoquinone is recovered.

In 2 volume parts of ethyl ether is dissolved 0.5 part of 2 - methyl-3-(3-methyl-3-methoxycarbonylpropyl)-1,4-naphthoquinone. The solution is combined with 2 volume parts of 50 weight percent aqueous solution of sodium dithionite and the whole mixture is shaken sufficiently.

After a yellow color of the ether layer has faded away, is added to the ether layer 7 volume parts of a 30 weight percent aqueous solution of potassium hydroxide under ice-cooling, followed by stirring in nitrogen gas stream for 5 hours.

After completion of the reaction, the reaction mixture is made acid with diluted hydrochloric acid, and the whole mixture is extracted with ethyl ether. The ether extract is washed with water and dried over anhydrous sodium sulfate. To the ether solution are added 0.5 part of magnesium sulfate and 0.5 part of silver oxide and the whole mixture is shaken sufficiently. Solid substance(s) are removed off by filtration, and the filtrate is subjected to distillation under a reduced pressure to leave yellow crystals.

The crystals are recrystallized from ethyl ether-hexane to give 0.42 part of 2-methyl-3-(3-carboxy-3-methylpropyl)-1,4-naphthoquinone as yellow plates melting at 112 to 113° C.

Significant maximum absorption in infrared absorption spectrum ($\nu$ in KBr, cm.$^{-1}$): ~ 2600, 1700(COOH), 1660, 1620(quinone)

Significant maximum absorption in ultraviolet absorption spectrum

[$\lambda$ in C$_2$H$_5$OH, m$\mu$ (E$_{1\ cm.}^{1\%}$)]:

oxidized form: 244(585), 248(595), 264(538), 272(559) 330(79.5)
reduced form: 247(1114), 274(137), 325(117), 336 (120)

Nuclear magnetic resonance spectrum ($\tau$ in CCl$_4$): 8.68 (CH$_3$ in side chain, doublet), 8.5 to 8.0 (CH$_2$, multiplet), 7.83(CH$_3$ on nuclear, singlet), 7.6 to 7.0 (CH$_2$ on nuclear, CH, multiplet)

Elementary analysis.—C$_{16}$H$_{16}$O$_4$:
Calculated: C, 70.57; H, 5.92.
Found: C, 70.32; H, 5.98.

What is claimed is:
1. A member selected from the group consisting of a compound of the formula

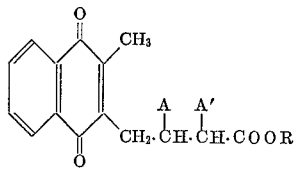

wherein one of A and A' is hydrogen and the other is lower alkyl, and R is a member selected from the group consisting of hydrogen, alkyl of 1–6 carbon atoms, cycloalkyl of up to 6 carbon atoms and allyl, and pharmaceutically acceptable salts thereof.

2. A compound as claimed in claim 1, wherein A is a lower alkyl group and A' is a hydrogen atom.

3. A compound as claimed in claim 1, wherein A is a hydrogen atom and A' is a lower alkyl group.

4. A compound as claimed in claim 1, said compound being 2 - methyl-3-(3-methyl-3-methoxycarbonylpropyl)-1,4-naphthoquinone.

5. A compound as claimed in claim 1, said compound being 2 - methyl-3-(3-carboxy-3-methylpropyl)-1,4-naphthoquinone.

References Cited
UNITED STATES PATENTS
2,398,418   4/1946   Fieser _____ 260—396 R OTHER REFERENCES
Fieser et al.: J. A. C. S., V. 62, pp. 2966–70, 1940.

VIVIAN GARNER, Primary Examiner

U.S. Cl. X.R.

260—485 R; 424—308, 317